(12) United States Patent
Sprague et al.

(10) Patent No.: US 8,175,634 B2
(45) Date of Patent: May 8, 2012

(54) SOFTWARE SWITCH FOR SEPARATING WORK AND PERSONAL INFORMATION ON CELL PHONE DEVICES

(75) Inventors: Mary Ann Sprague, Macedon, NY (US); Jennifer Perotti, Pittsford, NY (US); Mary Catherine McCorkindale, Fairport, NY (US); Patricia Swenton-Wall, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 387 days.

(21) Appl. No.: 12/510,377

(22) Filed: Jul. 28, 2009

(65) Prior Publication Data

US 2011/0028124 A1 Feb. 3, 2011

(51) Int. Cl.
*H04M 1/00* (2006.01)
(52) U.S. Cl. .................. 455/550.1; 455/406; 455/407; 455/408; 455/409; 455/418; 379/111; 379/114.03; 379/114.17; 370/310.2

(58) Field of Classification Search .......... 455/406–409, 455/418, 550.1; 370/310.2; 379/111, 114.03, 379/114.17
See application file for complete search history.

(56) References Cited

U.S. PATENT DOCUMENTS

| | | | | |
|---|---|---|---|---|
| 5,625,669 A | * | 4/1997 | McGregor et al. | 455/418 |
| 5,835,856 A | * | 11/1998 | Patel | 455/406 |
| 6,173,171 B1 | * | 1/2001 | Plush et al. | 455/408 |
| 6,282,274 B1 | * | 8/2001 | Jain et al. | 379/114.26 |
| 6,757,371 B2 | * | 6/2004 | Kim et al. | 379/114.22 |
| 6,925,160 B1 | | 8/2005 | Stevens et al. | |
| 2002/0042715 A1 | * | 4/2002 | Kelley | 705/1 |

\* cited by examiner

*Primary Examiner* — Steve D Agosta
(74) *Attorney, Agent, or Firm* — Ronald E. Prass, Jr.; Prass LLP

(57) ABSTRACT

This is a cell phone system that provides for use of a single phone for both business and personal calls. This system permits the user to extract personal calls from the system, thereby preserving the confidential nature of some of these personal calls without the business having to review them to determine allocation of costs to user and business.

11 Claims, 3 Drawing Sheets

Export Group Information
- Select information to extract
- _X_ [P] Phone numbers
- ___ [T] Text messages
- ___ [C] Contact Information
- ___ [O] Other documents
- ___ [A] All marked information

- Select Category to Extract (1 or more)
- _X_ [P] Personal
- ___ [W] Work
- ___ [O] Other

- Select Date range to Extract (1 or more)
- _X_ June – July
- ___ Aug – Sept"
- ___ Change time increments...

- Enter email address to export information to:
  _____

- Delete information from Phone upon Export? [Yes] [No]

[Export]  [Cancel]

Group Tagging Setup

Categories — 2

W – Work
P – Personal
O – Other

[Edit Category...]
[Add Category...]

Category Prompts — 2

Phone numbers:

[] upon entry,
[] upon disconnect;
[] upon shut down;
[] every day
[] once a week

Email addresses:

[] upon entry,
[] upon send
[] upon shut down;
[] every day
[] once / week

Pictures:

[] upon creation;
[] upon send
[] upon shut down;
[] every day
[] once / week

Other documents:

[] upon creation;
[] upon send
[] upon shut down;
[] every day
[] once / week

[Export...] [Done] [Cancel]

FIG. 1

Export Group Information

- Select information to extract
- _X_ [P] Phone numbers
- ___ [T] Text messages
- ___ [C] Contact Information
- ___ [O] Other documents
- ___ [A] All marked information

- Select Category to Extract (1 or more)
- _X_ [P] Personal
- ___ [W] Work
- ___ [O] Other

- Select Date range to Extract (1 or more)
- _X_ June – July
- ___ Aug – Sept"
- ___ Change time increments...

- Enter email address to export information to:
  _____

- Delete information from Phone upon Export? [Yes] [No]

[Export]   [Cancel]

SOFTWARE SWITCH FOR SEPARATING WORK AND PERSONAL INFORMATION ON CELL PHONE DEVICES

This invention relates to communication means and, more specifically, to cell phone devices.

BACKGROUND

While this invention will be described for clarity as it applies to cell phones, it can equally be used on PDAs or office desk phones, if desired. In addition, while this disclosure and claims will be described in reference to cell phone calls, this invention applies equally as well to other communications such as text messages, email, internet data usage, application usage, photos, document access or any other media stored in the phone. Therefore, the term "media" is intended to include all of these various media.

Use of company-provided cell phones for personal use is often discouraged or forbidden. Users often end up carrying additional devices (cell phones, computers, thumb drives, etc.) to keep personal information and make personal calls or other communications such as texting, taking photos, accessing documents, etc. This practice can get frustrating and cumbersome, especially when traveling for business. Alternately, using personal cell phones for work calls (i.e. conference calls or customer calls), makes reimbursement difficult without submitting the itemized bill of the specifics of all personal calls or media. When the term "call" is used throughout this disclosure and claims, other media than "calls" are intended to be included in this term.

SUMMARY

This invention proposes a software switch that can be added to cell phone devices that are used for work and personal purposes. The switch would provide an easy mechanism to identify items or media (e.g. phone calls, text messages, images, audio files, contact information, documents) that are for personal or work use and also used to extract personal call or media or work specific information. This mechanism would allow the files and information to be separated in a simple manner for work or personal use such as billing charges for work calls or media and extracting the personal or work calls or media from the charge or records. It would also eliminate the need to carry additional cell phones or possibly other devices. Also, this mechanism would be handled at the device rather than at the phone company, allowing the information or media to be separated and easily extracted from the phone as needed.

There are several reasons that personal calls or media would need to be separated on a cell phone. First, if the phone were a work-provided phone, then personal calls or media may be discouraged or prohibited. An employer may not wish to have personal media information or calls made on a work-provided phone. If the phone needed to be surrendered to the company, the user would obviously wish to remove the personal information (numbers, messages, pictures, contacts, other files) before the phone was surrendered. This event might also happen if the phone were upgraded or the user left the services of the employer.

Secondly, a user may have a personal cell phone and need to use that phone for work-related calls or media, e.g. a conference call or information while out of the office or contacting customers. In these cases, it is important to the user to extract the information about the work-related call or media and provide it to the employer without specifics of the nature of the private call(s). The work related calls or media can then be reimbursed to the employee without the necessity of the business knowing the nature of the private media or calls. Extracting the information from the phone could also eliminate the need of waiting for a bill and submitting a personal bill for reimbursement without needing to surrender private information to the employer that the user might wish to avoid.

In addition to extracting personal media or call information, another advantage of this invention is that users can specify which areas of their phone are related to work and which areas are used for personal use. For example, users can specify which phone numbers are for work or for personal use in a phone. If a phone number or other information is used for both, the user can specify both and the device and associated software will allow the user to designate the purpose each time the information is accessed. For example, if a phone number is designated as both personal and work, whenever this number is called the user can designate whether that particular call is for work or personal use.

Documents and files such as text messages, emails, music files or pictures or other media on a cell phone can also be designated as work, personal or both. Personal files and applications can be stored in an area of the phone that the user's company cannot access, possibly through a password access or other security mechanism and these personal files and applications can easily be extracted from the system. If the information is already designated for work or personal use, the usage of this information will be logged and the user will not be asked for additional information. For example, if an outgoing phone call was made to a number registered as a work number, that call would be logged in a list containing the work usage for that device. If, however, the information is not pre-specified, then the user would be prompted to specify the purpose at the time of usage. The device could track how many calls or how much bandwidth is used for work to support billing and could keep the user's personal information private from his or her company.

Options:
(1) Settable categories: Default of 3 categories—personal, work and both. Allow creation of multiple categories such as Alternate Work, School, Business, Consulting, Clients.
(2) Favorites: Application could scan existing information in email or other cell phone categories (messages, pictures or contacts) and allow the user to mark or categorize information like files and phone numbers into the pre-specified categories.
(3) Settable sorting and organizing of information: At creation/arrival when information is created or when a phone call or email arrives and also at regular intervals, the application could automatically categorize the information into the pre-specified categories based on key words in files or other cues that would help with categorization. Users could set up this automatic organization to take place regularly (hourly, weekly, startup). The automatic categorization function would also be beneficial when the tool is first installed.
(4) Reports: Reports could be provided upon request or automatically at a set interval. This could be used to check the classification of information and names and provide information for corporate billing. The text could be saved or forwarded elsewhere via email. Reports could be for a given time period or for all information on the device.
(5) Split screen view: This would show a cell phone or PDA screen broken down with the categorical information in different areas on the screen or switchable between the categories based on the size of the display screen (this would be specifically for Smart phones with larger screen real estate).

(6) Extract Category: This is the ability to extract all information registered to a personal category. It could possibly be used to extract all personal information to a specific folder or zip file and transfer the information to an external location or thumb drive for removal; for instance, when leaving a company or archiving a project. Other methods for extracting the data include email, wi-fi or using a SIM card reader.

This invention provides for an application that would be installed on a cell phone. The application would contain 3 default categories—work, personal and both. The user could add more categories, if desired. When the application is installed, the application would walk the user through a set of questions or screens that would help categorize frequently called numbers, files, folders, etc., into the pre-specified categories. See FIG. 1. This would set up a basis that any incoming or new information would be checked against for logging.

All information that is tagged with a category could either store the category tag in metadata with the information (such as an additional field in a contact) or store it in a list for that category (such as a list of personal phone numbers). This tagging would allow the user to easily retrieve and extract all tagged information of a particular category to be used as needed.

One of the important features of the present invention and critical to the present invention is that the user need not identify to the company what personal calls were made (or files were stored) and is able to extract these personal calls from the system. Only the number of personal calls made and not the specifics of these calls conveyed to the company are identified. Many times calls of a personal nature such as calls to a doctor or lawyer that are privileged may have this "privilege" destroyed by disclosure to others such as the company personnel. Also, sometimes other personal calls such as those related to sickness or finances may be kept confidential by extraction of these calls from the cell phone listings. There may also be several other reasons why it is important to extract the nature (not the amounts of calls) of personal calls from the system.

This invention provides a way for users to set up categories that are application independent and able to separate information (files, email, and text) based on those categories both for company, business and personal use. This invention would help users separate information into specific categories that could help information to be segregated, tracked and extracted in an easy manner. Several solutions do exist that allow for the separation of information at the server side rather than at the device side. The device side solution would allow the user to maintain possession of the categorization information and not rely on another entity for the information.

U.S. Pat. No. 6,925,160 describes a system that allows the categorization of cell phone calls as personal or business, from single callers or from a plurality of callers. This patent is written to support the goals of businesses in making sure employees are not charging personal calls to business accounts. The process described assumes that calling history is transferred to a computer, and the categorization is done on that computer for the purposes of charging business calls to the business account, and making sure the business doesn't pay for personal calls.

The present invention is unique from this patent in several ways—a motivation for writing is to support cell phone users in keeping personal information private from their businesses. Therefore, users have the option of encrypting personal information so it is not accessible to their employer and/or storing personal information on removable storage media inside the phone.

Another unique feature of the present invention is that the categorization of information is done on the phone. This allows users to categorize calls and other information at the time when they are used, to facilitate more accurate categorization.

Thirdly, the present invention is unique in that it allows users to categorize multiple kinds of information inside the phone (calls, pictures, documents, text messages, or any other media stored in the phone) the patent U.S. Pat. No. 6,925,160 mentioned above applies only to calls.

In U.S. Pat. No. 6,925,160 (Stevens), as noted above, a method for managing cellular telephone accounts is disclosed where each call is categorized as a business call or a personal call associated with a given telephone number. The disclosure of Stevens is clear that all calls are reviewed by the company and ultimately approved by the company which then allows charges to be appropriately allocated to users for personal calls made or received. claim 1 of Stevens' patent is clear that "the users and manager of the users to view all of the specifics of the thus-designated business activities and personal activities on a display and for allowing the users and managers to modify and re-designate a given activity". In many instances, the user may not want the managers (business) to know the nature of the personal calls or media made as is required and necessary in the Stevens' system.

The present invention solves this problem by permitting the users to separate calls or media and extract the nature of the personal calls or media in any easy manner. Obviously, the number of personal calls or information made will remain in the system. This would not interfere with any business or company concerns as it is easy to calculate the number and costs of personal calls since the total calls and time made minus the itemized business calls would equal the number of personal calls or media made and time allocated to these personal calls.

In the present invention, users can designate how different categories of information will be handled within the phone. For example, the user can designate that all information categorized as personal will be encrypted, and accessible only by use of a password.

Users could also designate that the information categorized as personal will be removed from the phone at various intervals, using various techniques. For example, users can designate that personal information will be stored on the phone's removable storage media. They could also designate that personal information will be automatically uploaded to a specific computer by wi-fi when that computer is accessible.

Users can also designate the timing of removing personal information. For example, they may choose that the phone will remove personal information once a month (and transfer it to the media of their choice). In this scenario, the computer could prompt the user to upload data to a computer each month when the phone is connected to that computer (either wirelessly or otherwise). The phone could also automatically upload personal information once a month when the phone is connected. This same behavior could be applied to removable storage. The computer could prompt the user to download personal information to removable storage once a month, or could automatically transfer personal information to removable storage at the time that has been pre-specified by the user.

WRT timing—the user could specify transfer of personal data at various time intervals, or in response to various events or activities (i.e., when the camera contains a specific number of pictures or calls, or when the user docs the phone with the computer).

An option can be set in the settings of the "Work/Personal" switch application that allows the application to prompt the user for a category designation either before, after, or at a preset interval of time for any information that has not yet been categorized.

BRIEF DESCRIPTION OF THE DRAWINGS

FIG. 1 is an illustration of one embodiment of this invention where a setting window or display on a cell phone is used.

FIG. 3 illustrates an embodiment of this invention where commands on selecting information to be exported is presented.

DETAILED DISCUSSION OF DRAWINGS AND PREFERRED EMBODIMENTS

Figure 2:
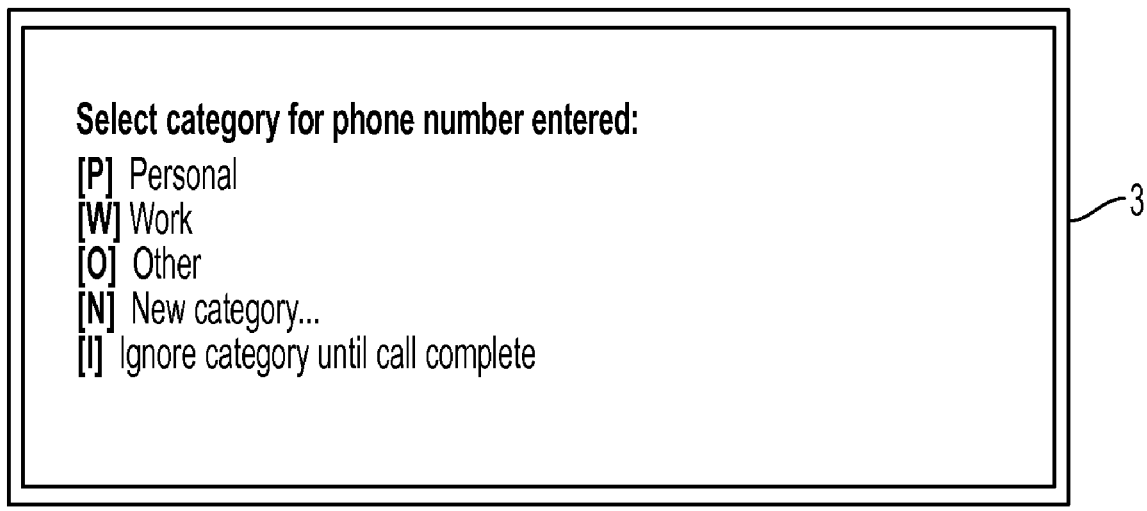
FIG. 2 illustrates an embodiment of this invention where a prompt setting may be used on a PDA or cell phone.

In FIG. 1, a settings window or display 1 showing information 2 on a phone that needs to be categorized is shown. There are several different scenarios that could be used for using such tagged category information 2:

Track phone information 2 on a PDA or cell phone.

Track email messages on PDA or cell phone.

Track other information on a cell phone or PDA such as pictures, contacts or other files stored locally.

Some of this information may also be available through the phone company but the user may not wish to have the personal information revealed to the employer or the turnaround time for retrieving this information may not be efficient.

A prior phone book of frequent personal and work phone numbers may be entered into the software or phone numbers can be added as used to enhance this phone book. Also present in the software could be a user interface that could question the user on certain aspects of separation of business and personal calls such as "is this the same Mary Jones in the phone book at (716) 000-0000?"

In FIG. 2, to categorize the above listed pieces of information on the cell phone, the application will be running in the background. The following example is given for phone numbers, but would be applied to any of the above listed types of information found on the cell phone device.

In this example, the prompt setting 3 is set for "Upon entry". The user would enter the phone number as normal. When the Call button is pressed, the number is checked against the list of already categorized numbers. If the number is not found in that list, a prompt message would be presented to the user, as shown in FIG. 2.

The user would select the character by using the Left, Right, Up, Down scroll buttons provided on the cell phone and select with the provided select button. The window would then close and the call would commence.

If "Ignore" is selected, then the call would commence without the number being categorized, and the window would reappear when the call is ended. Once the category has been selected from this window, the phone number would be entered into the category list under the correct category.

This same entry window would appear at any of the selectable setting times that are presented in the settings window. If "New" category is selected, then a window would appear that would allow the user to select a letter or number as a representative symbol for the new category and a text string of a reasonable length for the given cell phone would be provided for the user to enter a phrase to explain the new category. Once a new category is created, then all appropriate application windows would be updated to include the new category.

The user can choose to leave certain pieces of information uncategorized, and process groups of information when they have time. For example, in the above example the user could choose not to categorize several calls upon entry. These calls would be marked as uncategorized within the phone. The user could later access a list of uncategorized information and batch categorize them. For example, the uncategorized information could be presented as a list containing check boxes. The user could check the boxes of all the numbers called for personal reasons, choose "personal" from a button or menu, and press "save." These numbers would then be categorized as personal.

Users can also change the categorization of pieces of information. They can access a list of information categorized as personal, click on one or more of the numbers, and select a different category for the selected information.

In FIG. 3, if the user desires to export the information for a given category, then the user would enter the application settings window (most commonly found in the Settings tab of the phone or related tab on the phone. The user would select the "Export" button that would bring up an Export Window. A sample of the window has been shown in FIG. 3.

The personal calls must be able to be extracted by the user while it is not important for business calls to be extracted. Business calls would be clearly listed and shown; the remainder not listed are personal calls that are paid by the user. The user's responsibility can easily be calculated by subtracting business calls listed (and their time and cost) from the total calls shown on the cell phone. The company or business is then reimbursed for the remainder of costs and calls or arrangements can possibly be made with the provider to pay on separate accounts.

In summary, this invention provides a cell phone system for business and personal calls or media to be made in the same cell phone. The term "calls" as used throughout this disclosure includes other media. This system comprises the addition of software and a switch on the phone that provides for separation, identification and distinguishing business calls from personal calls made on the phone. This separation is subsequently used for allocating charges of the business and personal calls and provides user-controlled partitioning of the personal from the business calls. The system has a separator that permits the user to extract the nature or phone numbers of personal calls or media from the system, thereby leaving only total calls and identifiable business calls or media in the system; the balance would be personal calls or personal media. The system is configured to permit the user to present the total calls and the remaining business calls to the business and permits the user to reimburse the business for all personal calls determined by subtracting the business calls from the total calls. The system is configured wherein a provider of said cell phone service is always paid for the total calls made. The system is configured wherein the business is never aware of the nature of the personal calls but is always aware of the total personal calls involved, the times of these calls and the costs associated with the personal calls, and the business is totally reimbursed by the user for all the personal calls made on the cell phone. Obviously the business must approve of the system prior to initiating.

The system comprises a display and associated software to assist the user in identifying all personal calls and permits the user to extract specifics of the personal calls from the system. This is extremely important to the present invention. The system is configured wherein a usage and payment policy agreeable to the business and user is determined prior to use of the system. The total calls and business calls made are verifiable by a provider of the cell phone service. The system's switch may be an electrical switch or a touch screen. The system is configured wherein existing software in the cell phone is modified to include software of the present system. This system is configured wherein only the user is aware of the specifics and nature of the personal calls thereby preserving any privileged communications associated with the personal calls. The system is configured wherein the cell phone is provided by the business for business use but approved for reimbursable personal use. As noted above, in the following claims, the term "calls" includes other media defined earlier in this disclosure.

It will be appreciated that variations of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A cell phone system that provides for business and personal calls to be made on the same cell phone, said system comprising:

software and a switch on said phone that provides for automatic separation, identification and distinguishing of business calls from personal calls made on said phone, said automatic separation being subsequently used for allocating charges of said business and personal calls, automatic partitioning of said personal from said business calls based on pre-set user controls, extracting said personal calls from said system thereby leaving only total calls and identifiable business calls in the system, and automatically presenting the total calls and the remaining business calls to the business which permits the user to reimburse said business for all calls determined by subtracting said business calls from said total calls, wherein said business is not provided with the nature of said personal calls but is automatically provided with the total personal calls involved, the total times of these calls and the cost associated with said personal calls and only said user is aware of the specifics and nature of said personal calls thereby retaining any privileged communications associated with said personal calls.

2. The system of claim 1 wherein a provider of said cell phone service is paid for said total calls made.

3. The system of claim 1 wherein said business is reimbursed for all said personal calls made on said cell phone.

4. The system of claim 1 wherein business approval is obtained prior to initiating said system.

5. The system of claim 1 comprising a display and associated software to assist said user in identifying all personal calls and permits said user to extract specifics of said personal calls from said system.

6. The system of claim 1 wherein a usage and payment policy agreeable to said business and user is determined prior to use of said system.

7. The system of claim 1 wherein said total calls and business calls made are verifiable by a provider of said cell phone service.

8. The system of claim 1 wherein said switch may be an electrical switch or a touch screen.

9. The system of claim 1 wherein existing software in said cell phone is modified to include said software of said system.

10. The system of claim 1 wherein said cell phone is provided by said business for business use but approved for reimbursable personal use.

11. The system of claim 1 wherein said "calls" include other media selected from the group consisting of text messages, email, internet data, application usage, photo document access and other media capable of being stored in a phone.

* * * * *